(12) United States Patent
Burgess et al.

(10) Patent No.: US 12,724,186 B1
(45) Date of Patent: Sep. 1, 2026

(54) ANTI-RETROREFLECTION FILTER

(71) Applicants: Christopher David Burgess, Salisbury (GB); Lee Hill, Salisbury (GB)

(72) Inventors: Christopher David Burgess, Salisbury (GB); Lee Hill, Salisbury (GB)

(73) Assignee: THE SECRETARY OF STATE FOR DEFENCE, Salisbury (GB)

( * ) Notice: Subject to any disclaimer, the term of this patent is extended or adjusted under 35 U.S.C. 154(b) by 1682 days.

(21) Appl. No.: 17/300,696

(22) Filed: Nov. 24, 2020

(30) Foreign Application Priority Data

Dec. 9, 2019 (GB) .................................... 1918159

(51) Int. Cl.
*G02B 5/26* (2006.01)

(52) U.S. Cl.
CPC .................................... *G02B 5/26* (2013.01)

(58) Field of Classification Search
None
See application file for complete search history.

(56) References Cited

U.S. PATENT DOCUMENTS 3,909,107 A * 9/1975 Numbers ............ G03B 11/045 396/534
5,815,316 A * 9/1998 Friedman .............. G02B 23/12 359/600
7,344,255 B2 * 3/2008 Hara ................. G03B 21/2053 353/97
2004/0080819 A1 * 4/2004 Regan ..................... G02B 7/24 359/429
2008/0025719 A1 * 1/2008 Uehara ................ G03B 11/043 396/448
2010/0238419 A1 * 9/2010 Mochizuki ............. F21V 14/08 359/232

OTHER PUBLICATIONS

A. Mieremet, et al., Retroreflection reduction by masking apertures; Optical Engineering, Apr. 2010, pp. 043202-1 to 043202-11, vol. 49(4).

* cited by examiner

*Primary Examiner* — Robert E. Tallman
(74) *Attorney, Agent, or Firm* — Oliff PLC

(57) ABSTRACT

A filter for a lens capable of causing retroreflection. The filter comprises a light blocking arrangement adjustable to be stably switched between three states: Fully Open, Fully Closed, and Partially Restricted. In the Partially Restricted arrangement, at least 50% of the incoming light is blocked, and any optical path into and out of the inlet in diametrically opposite locations is blocked. The filter is arranged to aid a user in switching the filter to the partially restricted arrangement.

17 Claims, 1 Drawing Sheet

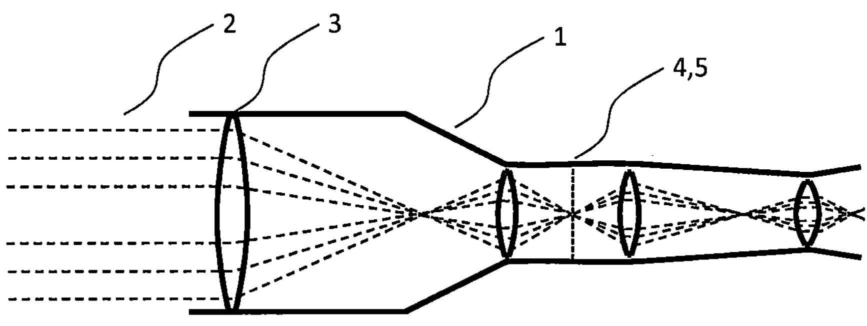
Fig 1. PRIOR ART
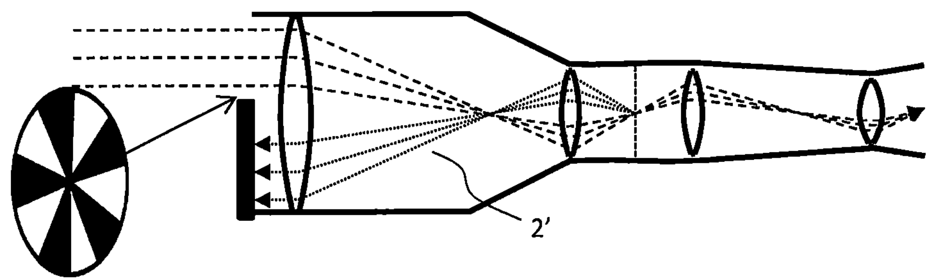
Fig 2. PRIOR ART
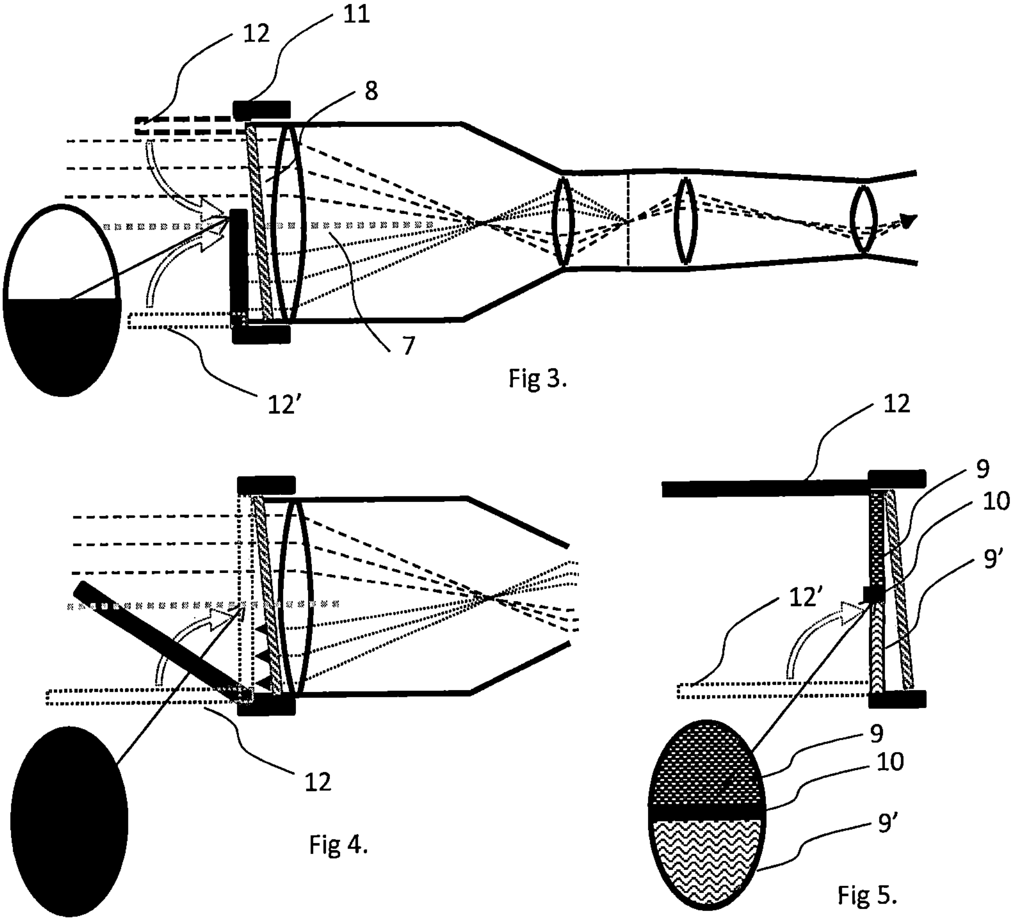
Fig 3.
Fig 4.
Fig 5.

ANTI-RETROREFLECTION FILTER

The present invention relates to the field of making optical viewing arrangements less visible when in use, in particular lens arrangements such as cameras, binoculars and sights. It is applicable both to lenses used with camera sensors, and those that aid viewing by eye, and mainly is for magnifying lens arrangements suitable for viewing a scene.

In the past, various approaches have been taken to reduce the detectability of such optical viewing arrangements (cameras, binoculars, and sights) from potential hostile actors who might wish to engage the user with violent force. Known approaches include covering cameras and sights whilst not in used, partially obscuring the sight, or applying various antireflection filters.

Optical arrangements of the types described above generally will have a somewhat reflective surface arranged at an optical plane. The optical plane in question might be an intermediate optical plane within the optical apparatus where for example a piece of glass etched with target cross-hairs might be positions, or alternatively the somewhat reflective surface might be the semiconductor sensor surface, or even the retina of the human eye when in use. Unless efforts are made to avoid it, generally light from a distant object (e.g. a laser source from a hostile actor) will impinge on that surface and some of that light will reflect in a specular fashion (i.e. as a mirror reflects rather than as a matt surface reflects) backwards, much of which will then be focussed by the lens arrangement directly back in the direction it came from. This is known as retro-reflection. Whilst retro-reflection is very hard to eliminate entirely, specular retro-reflection (which usually is the dominant type of reflection off from a glass or semiconductor layer element), can be reduced in several ways.

"Retroreflection reduction by masking apertures" Arjan L. Mieremet et al, discloses five methods to reduce specular retroreflection in its first figure. These are: Sensor Tilting, Camera Tilting, Applying an Optical filter, Defocussing, and Applying a Mask adjacent to the lens element (Masking).

Masking is the technique that is of primary interest here. Arjan et al describe how it is possible to place a light blocking mask that covers some locations to one side of a lens (Note however, that it is shown in cross section so the 2D shape of the mask is not discussed there, and so this may be assumed to correspond to a multiple sectored mask described later in the same document). Light that enters on the side of the lens that isn't blocked, and which retroreflects backwards in specular fashion (from a planar element at a focal plane such as an image sensor) will have an exit path that is on the other side of the lens (diametrically opposite with respect to the optical axis) which is blocked by the light blocking mask. This prevents specular retroreflection in the forward direction. On page 8 of Arjan et al, there is a discussion of how the effectiveness of such masks decreases with respect to viewing directions that are off-axis, and a variety of mask shapes are suggested (a 5 sector mask is discussed, however the case of a semi-circular mask (single sector) is not considered, presumably discounting this approach because of its strongly asymmetric properties). The document suggests permanently positioned masks having equal effectiveness with respect to any off-axis direction.

It is an object of the present invention to provide an improved retroreflection filter.

According to a first aspect of the present invention there is provided the filter of claim 1. This has the advantage of increasing the suitability of a lens to varied situations, whilst avoiding the cost of modifying the lens.

"Field of view" of the lens arrangement: In the case that the lens arrangement is a lens with a sensor then the area of the sensor defines the field of view. If the lens arrangement is for viewing using the human eye, then the field of view is the visible field of view in use. If the lens arrangement is a lens for use with an arbitrary sensor, then the field of view is generally defined by an objective lens of the lens arrangement, or the dimensions of any tube, holding structure and lens elements. It would be very much an exceptional case that the lens arrangement is essentially one lens element or one axially compact lens group without further light collimation or structure—in this exceptional case the field of view is the range of angles across which incoming light is focussed to an image, which generally is less than 180 degrees wide, normally less than 120 degrees wide, and in the main applications where use is anticipated typically is less than 30 degrees wide, and often less than 10 degrees wide. The field of view may be any shape but usually is either circular or square/rectangular, and the term free of obstruction 'across' the field of view generally refers to being free of obstruction across this two dimensional range/area. Similarly, the term 'width' refers in the case of a square/rectangular field of view to the diagonal width of the field of view. i.e. the maximum width. "Switching": This term excludes a pivoting or sliding mechanism that has nothing to help ensure the light blocking element will stop at the orientation/position corresponding to the pre-determined partially restricted position. In the case that the light blocking element pivots or slides into the partially restricted position, there must be a notch (or more generally a pre-set position that the light blocking element is biased to stop at), or a stop, or some haptic or other feedback, or some other position/dial selection aid, sufficient to aid the user to position the light blocking element at the correct orientation and to avoid the user positioning it at an incorrect orientation. Something other than the provision of a stop (to aid the user in setting the device to the partially restricted arrangement) is particularly important if the three arrangements are achieved by different orientation of a single flap. By contrast if the three arrangements are achieved by two flaps, then typically the partially restricted arrangement corresponds to one (usually a particular one) of the flaps being closed and the other being opened, and accordingly the means to aid the user in switching the light blocking element is simply that the relevant flap gets closed, which often would involve being closed to abut a stop. Whilst a preferred embodiment involves two flaps (e.g. opposed flaps), it is possible to implement the invention with only one single flap capable of fully covering the inlet, provided that that flap has a pre-set position that it is biased to stop at. The term "is capable of causing retroreflection" means that the lens is one that retroreflects in use (most typical positive lenses would cause retroreflection in use, provided that they either comprise something placed at an optical plane to cause reflection to cause reflection from that plane, or provided that in use they would be suitable for having something (e.g. an image sensor) placed at an optical plane to cause reflection from that plane).

Typically the group of pre-defined arrangements comprises: Fully closed, such that in use, light is blocked from entering the lens arrangement. This enhances the utility of the filter so as to offer more complete protection against not only retroreflection but also glint.

Preferably in the partially restricted arrangement, the light blocking arrangement fully blocks a region of the inlet, that region comprising all of the area of the inlet that is at the optical axis or to one side thereof, with respect to a direction that is perpendicular to the optical axis. This could also be described as a single-sector half-mask, and has the advantage that the off axis decrease in performance can be controlled to be limited to a particular direction (in one dimension) such as for example downwards towards the ground (or upwards towards the sky, or to one side), thereby permitting enhanced protection in the case that any threat is known as likely to only be below (or above, or to one side) the line of sight in use. Optionally an upper half is blocked in use. Alternatively a lower half is blocked in use. Alternatively one half is blocked, and the user is able to rotate this to any orientation desired.

Typically the light blocking arrangement comprises at least a first light blocking element operable pivotably to open from substantially flush with the inlet. This has the advantage that the filter can be easily adjusted by the user. In one embodiment the light blocking element may be movable slidably across the inlet, for example to pivot slidably across the inlet, but in a preferred embodiment the light blocking element is a pivotable blind, i.e. a flap.

In one embodiment: In the fully closed arrangement the first light blocking element is substantially flush with the inlet, In the partially restricted arrangement, the first light blocking element extends at an angle of between 30 and 80 degrees away from the inlet, and, In the fully open arrangement, the first light blocking element extends at least 90 degrees away from the inlet. This has the advantage that adjustment of only one blind can offer all three modes, making it easy for the user to switch between all three modes. In an alternative embodiment, the light blocking arrangement comprises two light blocking elements, wherein in the partially restricted arrangement one of the light blocking elements is closed and one is open. This has the advantage that in the partially restricted arrangement, the blind can be arranged flush with the inlet of the lens, to minimise off-axis decrease in filter effectiveness.

Typically the filter comprises a positive thread for connection to a lens. This offers a reliable connection to suit many lenses, and typically any industry standard thread is used, or a thread that matches the thread on a known lens.

Optionally the filter comprises a rotable filter mount, comprising a circular slide, arranged such that the light blocking arrangement can be manually rotated with respect to the positive thread. This permits the user to choose what orientation the light blocking element should be at, so as to optimise the directionality of any off-axis effects such as reduced anti-retroreflection performance, or such as off-axis glint, taking into account the direction of any likely threats. As an alternative, the filter may be adapted to slidably mate over the end of a lens of known type having a known outer diameter, and advantageously so as to permit manual rotation thereon but with sufficient grip thereto to prevent accidental rotation.

Optionally, in use in the partially restricting arrangement, the light blocking arrangement comprises a first filter having a first transmission profile to one side of the optical axis, and a second filter having a second transmission profile to the other side of the optical axis, the first and second filter profiles being mutually exclusive such that with respect to at least one wavelength band light is blocked from passing through both the first and second filters. Further optionally, the first transmission profile is selectively transmissive to light of a first polarised type, and the second transmission profile is selectively transmissive to light of a second polarised type, the first and second polarised types being opposite polarisations. As an alternative the first and second transmission profiles may comprise a pair of mutually exclusive wavelength filters.

Preferably the filter further comprises an infra-red absorbent filter arranged at the inlet in use, and arranged off-axis such as to cause glint to be off-axis (i.e. arranged such that at least a front surface thereof is not perpendicular to the optical axis). This enhances the protection offered. Preferably the infra-red filter is arranged such that in the partly restricted arrangement they are arranged between the light blocking element and the lens.

Preferably the filter comprises a wavelength specific filter, arranged to block specific wavelengths within the visible spectrum, wherein the at least one wavelength band excludes those specific wavelengths. This enhances the protection offered. Preferably the wavelength specific filter is arranged such that in the partly restricted arrangement they are arranged between the light blocking element and the lens. If both an infra-red absorbent filter and a wavelength specific filter are provided, then preferably the wavelength specific filter is arranged between a front surface of the infra-red absorbent filter and the lens.

Preferably in the partially restricted arrangement, the light blocking arrangement blocks 55%-80% of the area of the inlet. This enhances off-axis anti-retroreflection performance without blocking all of the incoming light. More preferably in the partially restricted arrangement, the light blocking arrangement blocks 60%-70% of the area of the inlet. This provides for strong off-axis retroreflection performance, whilst still allowing in a reasonable amount of incoming light.

According to additional aspects of the invention there are provided an optical sight or a camera comprising the filter of the first aspect, or a pair of binoculars comprising filters of the first aspect.

A preferred embodiment of the invention will now be described by way of example only, with reference to the figures, in which:

FIG. 1 is a cross-section diagram of a known type of lens arrangement, in particular a sight, showing inlet optical raypaths;

FIG. 2 is a cross-section diagram of the known type of lens arrangement, also showing a prior art optical mask, having a sector structure, for reducing retroreflection effects caused by the lens arrangement;

FIG. 3 is a cross-section diagram of the known type of lens arrangement, also showing a filter according to one embodiment of the invention arranged to reduce retroreflection effects, having two opposed flaps;

FIG. 4 is a cross-section diagram of a known type of lens arrangement, also showing a filter according to one embodiment of the invention arranged to reduce retroreflection effects; and FIG. 5 is a cross-section diagram of a filter according to one embodiment having a flap with two zones with mutually exclusive light filtering properties.

Turning to FIG. 1 a known type of lens, 1, is shown in cross section, this example being a sight suitable for a weapon, showing incoming optical ray paths, 2, through four lenses, 3 (only one labelled), converging at an intermediate focal plane, 4, and again when in use at the focal plane of the eye (not shown). It does not matter whether the lens provides a single internal focal plane (such as is commonly the case in a camera sensor with a simple lens arrangement) or two focal planes as is commonly the case in (such as is commonly the case with weapon sights and more sophisticated digital cameras). The incoming light, 2, reflects off from a surface, 5, arranged at an optical plane, 4, and returns through the lens arrangement via return paths (shown as 2' in FIG. 2) back out of the lens arrangement and back in the direction they came from.

In the depicted lens arrangement the surface, 5, at the focal plane is a glass wafer which in this example is marked with crosshairs. However alternatively, the surface might instead be an optical iris, but a common alternative is that the surface causing retroreflection (not shown) might be a semiconductor sensor surface, or the retina of the human eye (not shown). Irrespective of what type of surface causes the retroreflection, as shown in FIG. 2 this causes light to exit via a return path 2', which is guided by the lens(es) back in the direction that the light came from. This is known as optical lens retroreflection, and provides a way for an adversary to detect the lens arrangement. Typically the adversary might shine laser light and identify any locations where it returns from, and this indicates to the adversary the location of the lens, enabling the adversary to engage with potentially violent force.

FIG. 2 shows an arrangement suggested in the literature "Retroreflection reduction by masking apertures" Arjan L. Mieremet et al. This involves applying a mask adjacent to a lens, in which for any location where the mask transmits light, there is a second location diametrically opposite the optical axial and at that location the mask blocks light. Thus either incoming light is blocked by the mask, or it's retroreflection return path is blocked, thereby preventing all specular retroreflection in the axial direction. As Arjan et al acknowledge the effectiveness of the technique reduces for off-axis threats.

The mask suggested by Arjan et al is a static mask, left in place adjacent to the lens, providing full protection in the forward direction. The inventor has realised that this has disadvantages in terms of unnecessary reduction of incoming light, which is problematic in darker conditions, and that even the front optical surface presents a risk due to glint, which is unnecessary in other conditions.

In contrast, the present invention provides a filter, 11, that is switchable between three modes, fully blocked, fully open, and partially restricted. The embodiment shown in FIG. 2 uses two opposed flaps 12, 12' (saloon door fashion) so that either none, one or both can be closed to provide the three modes.

Accordingly FIG. 3 shows a preferred embodiment of the present invention. This has two flaps in 'saloon door' configuration—each is hinged to pivot inwardly to block light and outwardly to permit light through, and when both are closed they meet or overlap in the middle to fully block the lens. There are more complex (FIG. 5), and indeed simpler (FIG. 4) embodiments, and all of them provide including the preferred embodiment in FIG. 2, provide a convenient way to reliably switch between any of three configurations-fully open, fully closed, and partially restricted in a manner that prevents anti-retroreflection at least in the forward direction.

It is essential however that when the user switches to the partially-restricted arrangement the arrangement should guide the user in doing so, to avoid the possibility that the user will incorrectly set the partially restricted arrangement—in the embodiments of FIG. 2 (saloon door approach) and 5 (mutually exclusive polarised or coloured filters across a single filter) this is achieved easily for example by the user closing one of the flaps fully to a stopped position (in the manner of a door closing against a doorframe). It may be that no additional structure needs to be provided to ensure that the flap stops at the desired orientation- and indeed the filter could be designed with a particular lens in mind, such that when placed on the lens, it is the lens housing (or even the lens) itself that stops the flap at the correct orientation. In contrast to the FIG. 3 embodiment, in the embodiment of FIG. 4, the flap should be biased to click into place at a predetermined angle or angular range that provides the required level of protection (specifically, the degree to which protection is required for off-axis directions dictates whether the flap needs to be moved up to the optical axis or beyond the optical axis and indeed how far beyond the optical axis, 7).

The filter may to be able to close to a fully closed arrangement, for example with two flaps operable to close as a saloon door configuration. Alternatively only one flap may be arranged closable to cover one half but not all of the inlet.

Generally speaking, unless there is a reason not to (as is the case in the FIG. 4 embodiment) the preferred orientation for the partially restricted arrangement is either flush with the lens, or more generally such an arrangement that places the free edge(s) of the mask as close as possible to the front lens of the lens arrangement. This is because placing the mask as close as possible to the lens (or to put it another way, as far as possible from any optical plane) this reduces the tendency for the quality of the protection to vary for off-axis threats.

Whilst Arjan et al suggest a number of quite complex masks that provide for similar reduction in protection for any direction of off-axis threat, the inventor has identified that it is advantageous to deviate from this approach by providing a mask arrangement (in the partially restricted arrangement) that is asymmetric with respect to off-axis view direction in a particular direction (which may be a predetermined direction, or might be a user selected direction if the filter can be rotated manually by the user). Accordingly, deviating further from the approach suggested by Arjan et al, a preferred mask is to cover at least one entire half of the front of the inlet (i.e. a semicircular area one side of the optical axis, is fully blocked). This provides for strong protection of off-axis threats in one particular direction, for example for threats above the viewing direction, at the expense of less strong protection of off-axis threats in the other direction (for example threats below the viewing direction). As with all embodiments, it is beneficial to extend the blocked area to greater than 50%, however with the half-circle approach shown in FIG. 3 this can provide comprehensive protection for threats from all off-axis directions that a threat actor is likely to be found, in a wide range of situations.

FIG. 3 also shows a further protection element, 8, which in this embodiment is not perpendicular to the optical axis, but rather is tilted slightly downwardly, to mitigate glint (the tendency for the optical elements to reflect light causing occasional flashes of light as observed by a remote viewer-however this is just conventional reflection, and is not a retroreflection effect). Whilst glint is not actually prevented, it is redirected downwards which makes it less likely to be detectable to a remove viewer in many typical situations. Generally the further protection element also has an anti-reflective coating/layer.

The further protection element 8 may be an infra-red filter, and/or may be a visible light colour filter adapted to block specific wavelengths of visible light which are of concern to the user. The provision of an infra-red filter further reduces retroreflection (in the infra-red spectrum), especially in the fully open arrangement, and also particularly for off-axis viewing directions. The provision of a visible light colour filter further reduces the threat to the user, by helping to protect against laser threats which commonly have specific well-known wavelengths. Choosing the strength of the protection involves considering a trade off against reduction of optical transmission and/or causing the scene to appear falsely coloured, and this trade off can be readily tailored to the user's requirements.

Finally, for completeness, FIG. 5 shows a filter according to an embodiment of the invention. This has a pivoting mask which has (at least) two zones 9, 9' which have mutually exclusive light blocking properties, such that no visible light can pass through both. These may be filters with polarised properties, such as a horizontally polarised and a vertically polarised pair, a clockwise and anti-clockwise polarised pair, or a colour filter pair (e.g. red and green respectively). In this example, there are two zones which are substantially semi-circular, separated by a linear blocking element 10 to enhance off-axis protection. In this example the filter covers the inlet fully in the partially blocking arrangement, and so a second flap is provided when it is desired to fully block the inlet.

Throughout the description flaps have been described which pivot about an axis that is perpendicular to the optical axis, however the blocking element(s) could alternatively be operable to slide into position, or indeed to rotate slidably about an axis that is parallel to the optical axis. Also the enlarged view of each mask is shown as an oblique view and whilst shown oval would normally be circular (assuming the lens they are arranged to fit onto is circular).

Generally speaking there is provided a filter for a lens capable of causing retroreflection. The filter comprises a light blocking arrangement adjustable to be stably switched between three states: Fully Open, Fully Closed, and Partially Restricted. In the Partially Restricted arrangement, at least 50% of the incoming light is blocked, and any optical path into and out of the inlet in diametrically opposite locations is blocked. The filter is arranged to aid a user in switching the filter to the partially restricted arrangement.

The invention claimed is:

1. A filter configured to reduce retroreflective effects of an optical viewing lens arrangement that is capable of causing retroreflection in use and that defines a field of view thereof and that defines an optical axis thereof passing substantially centrally through an inlet thereof, the filter comprising:

a light blocking arrangement, that is adjustable to be stably switched between each of a group of pre-defined arrangements, with respect to at least one wavelength band, the group of pre-defined arrangements comprising:

fully open, such that in use, the inlet is substantially free of obstruction across its field of view, partly restricted, such that in use:

the light blocking arrangement blocks between 50% and 99% of incoming light entering the inlet, at least with respect to a forward viewing direction, and;

the light blocking arrangement is arranged to block any optical path having an axial inlet path through an inlet region of the inlet, and an axial exit path through an exit region of the inlet that is diametrically opposed to the inlet region with respect to the optical axis of the inlet;

wherein the filter comprises means to aid a user in switching the light blocking arrangement to the predetermined partly restricted arrangement, and to retain it stably there, and wherein in the partially restricted arrangement, the light blocking arrangement covers a region of the inlet, that region comprising all of the area of the inlet that is at the optical axis or to one side thereof, with respect to a direction that is perpendicular to the optical axis.

2. Filter of claim 1, wherein the group of pre-defined arrangements further comprises: fully closed, such that in use, light is blocked from entering the lens arrangement.

3. Filter of claim 1, wherein the light blocking arrangement comprises at least a first light blocking element operable pivotably to open from substantially flush with the inlet.

4. Filter of claim 3, wherein:

in the fully closed arrangement the first light blocking element is substantially flush with the inlet, in the partially restricted arrangement, the first light blocking element extends at an angle of between 30 and 80 degrees away from the inlet, and in the fully open arrangement, the first light blocking element extends at at least 90 degrees away from the inlet.

5. Filter of claim 1, wherein the light blocking arrangement comprises two light blocking elements, wherein in the partially restricted arrangement one of the light blocking elements is closed and one is open.

6. Filter of claim 1, comprising a positive thread for connection to a lens.

7. Filter of claim 4, comprising a rotatable filter mount, comprising a circular slide, arranged such that the light blocking arrangement can be manually rotated with respect to the positive thread.

8. Filter of claim 1, wherein in use in the partially restricting arrangement, the light blocking arrangement comprises a first filter having a first transmission profile to one side of the optical axis, and a second filter having a second transmission profile to the other side of the optical axis, the first and second filter profiles being mutually exclusive such that with respect to at least one wavelength band light is blocked from passing through both the first and second filters.

9. Filter of claim 8, wherein the first transmission profile is selectively transmissive to light of a first polarized type, and the second transmission profile is selectively transmissive to light of a second polarized type, the first and second polarized types being opposite polarizations.

10. Filter of claim 1, wherein the filter further comprises an infra-red absorbent filter arranged at the inlet in use, and arranged off-axis such as to cause glint to be off-axis.

11. Filter of claim 1, further comprising a wavelength specific filter, arranged to block specific wavelengths within the visible spectrum, wherein the at least one wavelength band excludes those specific wavelengths.

12. Filter of claim 1, wherein in the partially restricted arrangement, the light blocking arrangement blocks 55%-80% of the area of the inlet.

13. Filter of claim 12, wherein in the partially restricted arrangement, the light blocking arrangement blocks 60%-70% of the area of the inlet.

14. An optical sight comprising a filter of claim 1.

15. A pair of binoculars comprising two of the filters of claim 1.

16. A camera comprising a filter of claim 1.

17. An optical viewing lens arrangement comprising the filter of claim 1.

* * * * *